US012662232B2

(12) United States Patent (10) Patent No.: US 12,662,232 B2
Vassberg et al. (45) Date of Patent: Jun. 23, 2026

(54) SYSTEM FOR PROVIDING A FAVORABLE ENVIRONMENT FOR PROPULSION SYSTEM OF A BLENDED WING BODY AIRCRAFT AND A METHOD OF MANUFACTURING

(71) Applicant: JETZERO, INC., Long Beach, CA (US)

(72) Inventors: John Vassberg, Long Beach, CA (US); Blaine Rawdon, Long Beach, CA (US)

(73) Assignee: JetZero, Inc., Long Beach, CA (US)

( * ) Notice: Subject to any disclaimer, the term of this patent is extended or adjusted under 35 U.S.C. 154(b) by 0 days.

(21) Appl. No.: 18/101,914

(22) Filed: Jan. 26, 2023

(65) Prior Publication Data

US 2024/0253763 A1 Aug. 1, 2024

(51) Int. Cl.
| | |
|---|---|
| *B64C 1/16* | (2006.01) |
| *B64C 39/10* | (2006.01) |
| *B64D 27/40* | (2024.01) |
| *B64D 29/04* | (2006.01) |
| *B64D 33/02* | (2006.01) |
| *B64F 5/10* | (2017.01) |

(52) U.S. Cl.
CPC ................ *B64C 1/16* (2013.01); *B64C 39/10* (2013.01); *B64D 27/40* (2024.01); *B64D 29/04* (2013.01); *B64F 5/10* (2017.01); *B64C 2039/105* (2013.01); *B64D 2033/0226* (2013.01)

(58) Field of Classification Search
CPC ......... B64C 39/10; B64C 1/0009; B64C 1/16; B64C 2001/0045; B64C 2039/105; B64D 29/04; B64D 2033/0226
See application file for complete search history.

(56) References Cited

U.S. PATENT DOCUMENTS

| | | | | |
|---|---|---|---|---|
| 6,575,406 | B2 * | 6/2003 | Nelson | B64D 27/18 |
| | | | | 244/53 R |
| 10,287,024 | B2 * | 5/2019 | Suciu | B64D 27/14 |
| 10,814,995 | B2 | 10/2020 | West | |

(Continued)

FOREIGN PATENT DOCUMENTS

| | | | | |
|---|---|---|---|---|
| WO | WO-2010061071 A2 * | 6/2010 | | B64C 39/10 |
| WO | WO-2021007216 A1 * | 1/2021 | | B64C 21/00 |

OTHER PUBLICATIONS

"Aircraft Turbine Engine Air Entrance and Inlet Types." Aircraft Systems archived on Jul. 2, 2022 at Internet Archives available at https://web.archive.org/web/20220702235454/https://www.aircraftsystemstech.com/p/air-entrance.html (Year: 2022).*

(Continued)

*Primary Examiner* — Richard Green
(74) *Attorney, Agent, or Firm* — Jeffrey Schox

(57) ABSTRACT

A system for providing favorable environment for propulsion system of a blended wing body aircraft, wherein the system comprises a blended wing body, wherein the blended wing body comprises a main body, wherein the main body comprises a main body shaping comprising an upper aft surface configured to provide a favorable environment for a propulsion system of the blended wing body aircraft, and the propulsion system mounted to the upper aft surface of the main body, wherein the propulsion system comprises one or more prime movers, and a nacelle covering the one or more prime movers.

18 Claims, 5 Drawing Sheets

100

(56)                References Cited

U.S. PATENT DOCUMENTS

| | | | |
|---|---|---|---|
| 10,946,962 B2 | 3/2021 | Banerjee | |
| 11,396,365 B2 | 7/2022 | Page | |
| 2002/0145075 A1* | 10/2002 | Page | B64C 39/10 |
| | | | 244/36 |
| 2005/0218263 A1* | 10/2005 | Udall | B64C 25/001 |
| | | | 244/102 R |
| 2007/0023571 A1* | 2/2007 | Kawai | F02K 1/48 |
| | | | 244/119 |
| 2007/0040066 A1* | 2/2007 | McCoskey | B64C 25/405 |
| | | | 244/137.1 |
| 2008/0121756 A1* | 5/2008 | McComb | B64C 15/02 |
| | | | 244/60 |
| 2009/0072079 A1* | 3/2009 | Hawley | B64D 29/04 |
| | | | 244/54 |
| 2015/0021442 A1* | 1/2015 | Hunter | B64D 33/08 |
| | | | 244/53 R |
| 2016/0144972 A1* | 5/2016 | Florea | B64C 39/10 |
| | | | 244/53 B |
| 2018/0362161 A1 | 12/2018 | Banerjee | |
| 2019/0061966 A1* | 2/2019 | West | B64C 7/02 |
| 2019/0389581 A1* | 12/2019 | Chittick | B64C 3/14 |
| 2020/0283122 A1 | 9/2020 | Page | |
| 2020/0331591 A1 | 10/2020 | Page | |
| 2023/0264801 A1* | 8/2023 | Lazzara | B64C 1/0009 |
| | | | 244/130 |
| 2023/0322382 A1* | 10/2023 | Dindar | B64C 39/10 |
| | | | 244/36 |

OTHER PUBLICATIONS

Gang et al. "Blended Wing Body Thrust Reverser Cascade Feasibility Evaluation Through CFD." IEEE Acces. Nov. 2019 (Year: 2019).*

Kawai et al. "Blended Wing Body (BWB) Boundary Layer Ingestion (BLI) Inlet Configuration and Systems Studies." National Aeronautics and Space Administration. Dec. 2006. (Year: 2006).*

Liou et al. "Challenges and Progress in Aerodynamic Design of Hybrid Wingbody Aircraft with Embedded Engines." National Aeronautics and Space Administration. Jun. 2006. (Year: 2006).*

* cited by examiner

400

405

Receiving a Main Body Shaping for a Main Body of a Blended Wing Body Aircraft

410

Assembling a Propulsion System

Covering One or More Prime Movers using a Nacelle

415

Mounting Propulsion System to an Upper Aft Surface of Main Body

SYSTEM FOR PROVIDING A FAVORABLE ENVIRONMENT FOR PROPULSION SYSTEM OF A BLENDED WING BODY AIRCRAFT AND A METHOD OF MANUFACTURING

FIELD OF THE INVENTION

The present invention generally relates to the field of aircraft. In particular, the present invention is directed to a system for providing favorable environment for propulsion system of a blended wing body aircraft and a method of manufacturing.

BACKGROUND

Conventional jet transports have propulsion system mounted below and ahead of the wings where ensure a favorable environment for propulsion system. However, for blended wing body aircraft, other solutions for providing favorable environment for propulsion system are needed.

SUMMARY OF THE DISCLOSURE

In an aspect, a system for providing favorable environment for propulsion system of a blended wing body aircraft, wherein the system comprises a blended wing body, wherein the blended wing body comprises a main body, wherein the main body comprises a main body shaping comprising an upper aft surface configured to provide a favorable environment for a propulsion system of the blended wing body aircraft, and the propulsion system mounted to the upper aft surface of the main body, wherein the propulsion system comprises one or more prime movers, and a nacelle covering the one or more prime movers.

In another aspect, a method of manufacture of a system for providing favorable environment for propulsion system of a blended wing body aircraft, wherein the method comprises receiving a main body shaping for a main body configured to provide a favorable environment for propulsion system of the blended wing body aircraft, assembling a propulsion system, wherein assembling the propulsion system comprises covering one or more prime movers using a nacelle, and mounting the propulsion system to an upper aft surface of the main body.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for a blended wing body aircraft having a favorable environment for propulsion system and methods of manufacture. In an embodiment, a blended wing body aircraft has a compromised airfoil shape at a forward face of a non-wing portion of the blended wing body.

Aspects of the present disclosure can be used to provide favorable environment for propulsion system of blended wing body aircraft. Aspect of the present disclosure can also be used to improve aircraft propulsion system efficiency.

Aspects of the present disclosure allow for decreasing flow speed near entry of propulsion system of blended wing body aircraft. Exemplary embodiments illustrating aspect of the present disclosure are described below in the context of several specific examples.

In the following description, for the purposes of explanation, numerous specific details are set forth in order to provide a thorough understanding of the present invention. For purposes of description herein, relating terms, including "upper", "lower", "left", "rear", "right", "front", "vertical", "horizontal", and derivatives thereof relate to embodiments oriented as shown for exemplary purposes in FIG. 3. Furthermore, there is no intention to be bound by any expressed or implied theory presented in this disclosure.

Figure 1:
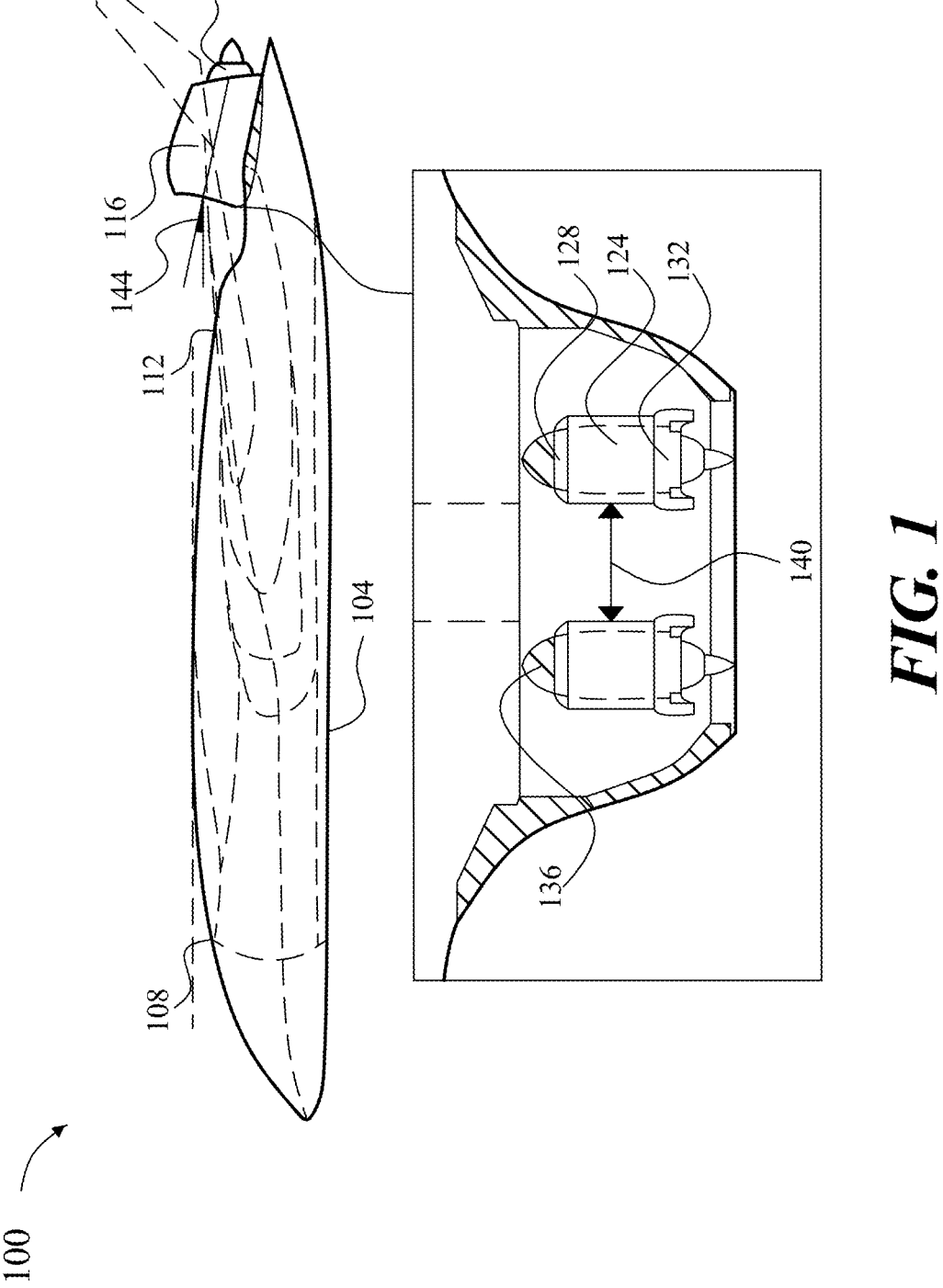
FIG. 1 is a side view of an exemplary system for providing favorable environment for propulsion system of a blended wing body aircraft.

Now referring to FIG. 1, a side view of an exemplary system 100 for providing favorable environment for propulsion system of a blended wing body aircraft is illustrated. System 100 include a blended wing body. For the purposes of this disclosure, a "blended wing body aircraft" is an aircraft having a blended wing body. As used in this disclosure, A "blended wing body" (BWB), also known as a "blended body" or a "hybrid wing body" (HWB), is a fixed-wing aircraft body having no clear demarcation between wings and a main body of the aircraft along a leading edge of the aircraft. For example, a BWB aircraft may have distinct wing and body structures, which are smoothly blended together with no clear dividing line or boundary feature between wing and fuselage. This contrasts with a flying wing, which has no distinct fuselage, and a lifting body, which has no distinct wings. A BWB design may or may not be tailless. One potential advantage of a BWB may be to reduce wetted area and any accompanying drag associated with a conventional wing-body junction. In some cases, a BWB may also have a wide airfoil-shaped body, allowing entire aircraft to generate lift and thereby facilitate reduction in size and/or drag of wings. In some cases, a BWB may be understood as a hybrid shape that resembles a flying wing, but also incorporates features from conventional aircraft. In some cases, this combination may offer several advantages over conventional tube-and-wing airframes. In some cases, a BWB airframe may help to increase fuel economy and create larger payload (cargo or passenger) volumes within the BWB. BWB may allow for advantageous interior designs. For instance, cargo can be loaded and/or passengers can board from the front or rear of the aircraft. A cargo or passenger area may be distributed across a relatively wide (when compared to conventional tube-wing aircraft) fuselage, providing a large usable volume. In some embodiments, passengers seated within an interior of aircraft, real-time video at every seat can take place of window seats.

With continued reference to FIG. 1, BWB include a main body 104. As used in this disclosure, a "main body" is a center portion of the BWB of the blended wing body aircraft which holds passengers and/or cargo. For instance, main body 104 may be a fuselage. In some embodiments, BWB may be contrasted by a wing tube body which has a clear transition between a tube fuselage and wings. In some cases, BWB may be contrasted by a flying wing, which effectively has no transition between wing and main body, as it theoretically comprises only a wing. In some embodiments, BWB further include a plurality of airfoil segments. As used in this disclosure, an "airfoil segment" is a section (i.e., region) of the blended wing body aircraft. In some embodiment, main body 104 may further include an outer mold line (OML). As used in this disclosure, an "outer mold line" is an airfoil segment's outer surface, wherein the airfoil segment is a section of BWB such as, without limitation, main body 104.

With continued reference to FIG. 1, main body 104 further include a main body shaping configured to provide a favorable environment for propulsion system 116 of blended wing body aircraft. As used in this disclosure, a "favorable environment" is an advantageous environment for propulsions system 116 to providing most thrust for blended wing body aircraft in a most efficient manner. In some cases, favorable environment may include, but is not limited to environment with, uniform flow speed, uniform flow direction, low flow speed, and the like thereof. As used in this disclosure, a "propulsion system" is a system of one or more machines that provide propulsion to system 100. In a non-limiting example, propulsion system 116 may include a plurality of machines that produce thrust to push blended wing body aircraft of system 100. Favorable environment as well as propulsion system disclosed here will be described in further detail below. As used in this disclosure, a "main body shaping" is a shape configuration for main body 104 of blended wing body aircraft. In some cases, main body 104 may further include an upper fore surface 108, wherein the upper fore surface 108 may include an upper fore surface shaping. As used in this disclosure, an "upper fore surface" is a surface of a front portion of blended wing body aircraft. In some embodiments, front portion of BWB aircraft may be located in front of the longitudinal center of BWB aircraft. In some embodiments, front portion of BWB aircraft may be located in front of the center of gravity of BWB aircraft. In some embodiments, the front portion may be located on the front 25% of blended wing body aircraft. As used in this disclosure, an "upper fore surface shaping" is a geometric contour of upper fore surface described above. In a non-limiting example, upper fore surface 108 may be a nose portion surface of blended wing body aircraft. In some embodiments, upper fore surface shaping may be configured to create a convexity with an airflow axis. For instance, as viewed from side of blended wing body aircraft, an airflow axis may be parallel to a bottom surface of blended wing body aircraft and an upper fore surface shaping may protrudes above the airflow axis, wherein the upper fore surface shaping may include a gradually increased height above airflow axis. In some embodiments, convexity of upper fore surface shaping may modulate a plurality of oncoming airflow behaviors and minimize aerodynamic drag. In some embodiments, upper fore surface shaping may be configured to increase an air flow speed in upper fore surface 108 of blended wing body aircraft. Further, main body 104 may include an upper aft surface 112, wherein the upper aft surface 112 may include an upper aft surface shaping. As used in this disclosure, an "upper aft surface" is a surface of a rear portion of blended wing body aircraft. In some embodiments, rear portion of BWB aircraft may be located rear of the longitudinal center of BWB aircraft. In some embodiments, rear portion of BWB aircraft may be located rear of the center of gravity of BWB aircraft In some embodiments, the rear portion may be located on the back 25% of blended wing body aircraft. As used in this disclosure, an "upper aft surface shaping" is a geometric contour of upper aft surface described above. In a non-limiting example, upper aft surface may be a tail portion surface of blended wing body aircraft. In some embodiments, upper aft surface shaping may be configured to create a concavity with an airflow axis. For instance, as viewed from side of blended wing body aircraft, an airflow axis may be parallel to bottom surface of blended wing body aircraft and an upper aft surface shaping may depresses below the airflow axis, wherein the upper aft surface shaping may include a gradually decreased height below airflow axis. In some embodiments, concavity of upper aft surface shaping may minimize air flow speed above upper aft surface 112 in order to maximize thrust produced by propulsion system 116 of blended wing body aircraft. In some embodiments, upper aft surface shaping may be configured to decrease air flow speed in upper aft surface 112 of blended wing body aircraft. In some cases, air flow speed in upper aft surface 112 may be less than air flow speed of freestream. Further, main body shaping may be further configured to provide a nose-up trim moment.

With continued reference to FIG. 1, main body 104 further include a propulsion system 116 mounted to an upper aft surface 112 of main body 104. In some cases, mounting propulsion system 116 may include mechanically fasten bottom of propulsion system to upper aft surface 112 of main body 104 using bolt. In some embodiments, mounting propulsion system 116 at an upper aft surface 112 of main body 104 may enable main body 104 and wings of blended wing body aircraft to efficiently block and reflect an aircraft noise. In some cases, aircraft noise may include, but is not limited to, forward-radiated fan noise, aft-facing jet noise, and the like thereof. In some embodiments, aircraft noise may be reflected by main body 104 and directed upwards, away from an airport community. In some embodiments, propulsion system 116 may be configured to not ingest boundary layer of upper aft surface 112 of main body 104; for instance, and without limitation, propulsion system 116 may include a nacelle as described in further detail below, wherein the nacelle may be attached to the center body upper surface and within the boundary layer. In other embodiments, propulsion system 116 may include an inlet located above a boundary layer of upper aft surface 112 of main body 104. As used in this disclosure, a "boundary layer" is a thin layer of fluid such as air in an immediate vicinity of a bounding surface formed by the fluid flowing along the bounding surface. In some cases, bounding surface may be upper aft surface 112. In a non-limiting example, boundary layer may be formed by air flowing along upper aft surface 112. In some embodiments, boundary layer may include a boundary layer depth, wherein the boundary layer depth may be very shallow at the beginning of main body 104 (leading edge) and increase in depth with a main body length. In some cases, boundary layer depth may be 1% of main body length. In a non-limiting example, boundary layer may include boundary layer depth of 1 foot for 100 feet aft of leading edge. In some cases, boundary layer may include a no-slip boundary condition, wherein under the no-slip boundary condition, boundary layer may have flow with zero flow velocity relative to upper aft surface 112. In other cases, boundary layer may include flow with a flow velocity monotonically increases above upper aft surface 112 until returns to a bulk flow velocity. Additionally, or alternatively, boundary layer may include a laminar boundary layer, wherein the laminar boundary layer may include very smooth flow. Further, boundary layer may include a turbulent boundary layer, wherein the turbulent boundary layer is a boundary layer with turbulent flow formed by decomposition of flow in laminar boundary layer. In some cases, turbulent boundary layer may create more skin fraction drag then laminar boundary layer flow. In some cases, inlet of engine may be configured to avoid ingestion of boundary layer, for instance by being located away from, e.g., above, the boundary layer.

With continued reference to FIG. 1, additionally, or alternatively, propulsion system 116 may be raised a certain distance above upper aft surface 112 of blended wing body aircraft. In some embodiments, without limitation, propulsion system 116 may be raised above a center of gravity (CG) of blended wing body aircraft. As used in this disclosure, a "center of gravity" is a point over which blended wing body aircraft would balance. In some cases, propulsion system 116 may be placed at an empty blended wing body aircraft CG aft. In some embodiments, without limitation, propulsion system 116 may be raised above a center of drag. As used in this disclosure, a "center of drag" is a point where total sum of a drag (i.e., pressure) field acts on main body 104, causing a force to act through the point. In some cases, propulsion system 116 may decouple thrust from a pitching moment during cruise and/or acceleration when a force vector passes through both CG and center of drag of blended wing body aircraft, wherein the force vector may be an engine thrust line of one or more prime movers 120.

With continued reference to FIG. 1, in some embodiments, propulsion system 116 include one or more prime movers 120. As used in this disclosure, a "prime mover" is an electronic or/and mechanical device that provides motive power. In an embodiment, prime mover may include an engine or motor. In another embodiment, prime mover may include a propulsor. The prime mover may be powered by electricity, fuel, gas, and the like. In an embodiment, prime mover 120 is further configured to propel blended wing body aircraft. In some cases, prime mover 120 may include a fan, wherein the fan may include a plurality of fan blades and may be surrounded by a fan case. In a non-limiting example, prime mover 120 may include a gas turbine with a propulsive fan. In some embodiments, prime mover 120 may include a turbofan engine. In a non-limiting example, prime mover 120 may be further configured to comprise an airflow entering propulsion system 116, combust the airflow, and exhaust airflow from a nozzle of prime mover 120. Prime mover disclosed here will be described in further detail below.

With continued reference to FIG. 1, further, propulsion system 116 of blended wing body aircraft include a nacelle 124 covering one or more prime movers 120. As used in this disclosure, a "nacelle" is a streamlined body housing, which is sized according to that which is houses, such as without limitation an engine, a fuel store, or a flight component. In a non-limiting example, nacelle 124 may be an aerodynamic and functional structure that surrounds prime mover 120. In some embodiments, nacelle 124 may further include a forward portion 128, wherein the forward portion 128 is a part of nacelle 124 that first encounters airflow. In some embodiments, nacelle 124 may further include a rear portion 132, wherein the rear portion 132 is a part of nacelle 124 that exhausts airflow. In some embodiments, without limitation, nacelle 124 may include a cowling, wherein the cowling is a removable covering of prime mover 120. In some embodiment, without limitation, nacelle 124 may include a thrust reverser, wherein the thrust reverser is a mechanical device that provide a temporary diversion of thrust from prime mover 120. In some cases, thrust reverser may allow deceleration of aircraft. Additionally, or alternatively, thrust reverser may include, but is not limited to, target thrust reverser, clam-shell thruster reverser, cold stream thrust reverser, and the like thereof. In some embodiments, without limitation, nacelle 124 may further include a fan cowl, wherein the fan cowl may provide an aerodynamic surface over fan case of prime mover 120 between forward portion 128 of nacelle and thrust reverser. In some embodiments, without limitation, nacelle 124 may further include an exhaust nozzle, wherein the exhaust nozzle is a nozzle to produce thrust. In some cases, exhaust nozzle may include a specially shaped tube through which air flow. As will be appreciated by persons having ordinary skill in the art, after having read the entirety of this disclosure, the foregoing list is provided by way of example and components of nacelle 124 can be added as an extension or improving the system 100 disclosed herein.

With continued reference to FIG. 1, in some embodiments, nacelle 124 further include one or more pylons, wherein the one or more pylons connect nacelle 124 with main body 104 of blended wing body aircraft. In some cases, pylon may prevent undesired disturbance of airflow toward propulsion system 116 of blended wing body aircraft. In other cases, pylon may be designed to be aerodynamic to reduce air resistance. In some embodiments, one or more pylons may be further configured to connect nacelle 124 to main body 104 as a function of a lateral offset, wherein the lateral offset may be laterally symmetric. In some cases, lateral offset may reduce yaw moment when propulsion system 116 fails. As used in this disclosure, a "yaw moment" is a movement around a yaw axis of main body 104 that changes a direction main body 104 is pointing, to left or right of the direction. In a non-limiting example, blended wing body aircraft may include a propulsion system 116, wherein the propulsion system may include two prime movers, each may be covered by a nacelle 124. Nacelle 124 may be connected to an upper aft surface 112 of blended wing body aircraft by one or more pylons. Two prime movers may produce equal thrust; however, a yaw moment may be created when a laterally offset prime mover fails and/or produce thrust inequal to another prime mover. In some cases, yaw moment may be countered by an aerodynamic yaw control device, wherein the aerodynamic yaw control device may increase blended wing body aircraft weight, drag and cost. In some embodiments, lateral offset may be constrained to a certain distance that results in minimal or acceptable weight, drag, and cost penalties from aerodynamic yaw control device control device.

With continued reference to FIG. 1, in some embodiments, nacelle 124 may further include a nacelle shaping configured to provide favorable environment for propulsion system 116. As used in this disclosure, a "nacelle shaping" is a geometric contour of nacelle 124 of blended wing body aircraft. In some cases, nacelle shaping may be configured to direct airflow towards one or more prime movers 120. In other cases, nacelle shaping may be further configured to direct airflow to flow around nacelle 124. Nacelle 124 may include an outer surface, wherein the outer surface is a surface around exterior of one or more prime movers 120. In some embodiments, outer surface of nacelle 124 may be configured to reduce and/or approximately minimize aerodynamic drag from one or more prime movers 120. Nacelle 124 may also include an inner surface, wherein the inner surface is a surface opposite to outer surface of nacelle 124. In some embodiments, inner surface of nacelle 124 may include a portion ahead of fan and prime movers, wherein the portion may define an inlet (i.e., inlet duct) configured to direct air to the fan and the prime movers. Inlet may be configured to slow the speed of the incoming air to a reduced Mach number; for instance, and without limitation, from Mach number of 0.85 ahead of the inlet to Mach number of 0.6 at the fan surface. Nacelle sha ping with such inner surface may permit improved fan efficiency by reducing Mach number at which fan blades operate. Cross section area of the inlet may be varied in the region approaching the fan to increase pressure and/or reduce Mach number with affordable energy loss. In some embodiments, directing airflow may provide one or more prime movers an acceptable airflow speed. In some cases, nacelle shaping may be a cylindrical shape. In a non-limiting example, forward portion 128 of nacelle 124 may include a first diameter and rear portion 132 of nacelle 124 may include a second diameter, wherein the first diameter is different than the second diameter. Additionally, or alternatively, nacelle 124 and pylon that connects with main body 104 of blended wing body aircraft may be streamlined. In some embodiments, nacelle 124 may be configured to be located within a depression 136. As used in this disclosure, a "depression" is a concavity in OML of upper aft surface 112. As a non-limiting example, nacelle 124 may be partially buried within upper aft surface 112.

With continued reference to FIG. 1, in some embodiments, propulsion system 116 may further include a separation distance 140 between a first prime mover and a second prime mover. As used in this disclosure, a "separation distance" is a distance between first prime mover and second prime mover wherein a chance of escaped parts of first prime mover damage to second prime mover and/or other critical system is low when rapidly rotating prime mover components will fail and burst out of nacelle 124. In some embodiments, separation distance 140 may be configured to avoid escaped parts of one prime mover 120 damaging remaining prime movers, wherein destruction of remaining prime movers may leave blended wing body aircraft without propulsion. In some cases, separation distance 140 may be lateral offset disclosed above. In other cases, separation distance 140 may also be a longitudinal space between one or more prime movers 120. In some embodiments, separation distance 140 may be further configured to avoid escaped parts of one prime mover 120 damaging an airframe structure of blended wing body aircraft. In a non-limiting example, airframe structure of blended wing body aircraft may be a center body rear spar located at an aft pressure bulkhead. In another non-limiting example, airframe structure of blended wing body aircraft may be an outer wing structural box. Additionally, or alternatively, separation distance 140 may be further configured to avoid escaped parts of one prime mover 120 damaging an aircraft system. In some cases, aircraft system may include, but is not limited to, auxiliary power unit, landing gear, signal and power wires, hydraulic lines, and the like thereof. In some cases, crucial aircraft system may be divided into a plurality of redundant systems and/or may be physically separated. Further, separation distance 140 may be further configured to avoid escaped parts of one prime mover 120 puncturing fuel tanks of blended wing body aircraft.

With continued reference to FIG. 1, in some embodiments, favorable environment for propulsion system 116 may include a conditioned region closed to an entry of propulsion system 116 of blended wing body aircraft. As used in this disclosure, a "conditioned region" is a location of BWB with an airflow condition. In some cases, airflow condition may include, but is not limited to, uniform air speed, uniform flow direction, low flow speed, and the like thereof. In some cases, conditioned region may be located at entry of propulsion system 116. In some embodiments, favorable environment for propulsion system 116 may include a region of uniform inlet airflow across entry of propulsion system 116. As used in this disclosure, a "uniform inlet airflow" is an airflow that is uniformed in terms of the airflow angle and the airflow speed across entry of propulsion system 116. In some cases, uniform inlet flow may be a symmetric airflow. In other cases, uniform inlet flow may be a uniformly off-axis flow. In a non-limiting example, uniformly off-axis flow may result in a cyclical variation in angle of attack of plurality of fan blade as fan moves around an axis, wherein the cyclical variation may further impose a cyclical structural load on plurality of fan blades of prime mover 120 within propulsion system 116 of blended wing body aircraft. Cyclical structural load may fatigue and/or fail fan and other components of system 100.

With continued reference to FIG. 1, in some embodiments, propulsion system 116 may include an angle of attack 144. As used in this disclosure, an "angle of attack" attack is an angle between a center line of propulsion system 116 and a vector representing relative motion between propulsion system 116 and the atmosphere. In some cases, favorable environment for propulsion system 116 may include a region of airflow with a particular angle of attack. In some embodiments, plurality of fan blade of prime mover 120 within propulsion system 116 of blended wing body aircraft may operate most efficiently at particular angle of attack. In some embodiments, a propulsion system 116 may be aligned with airflow, wherein the propulsion system 116 may include a constant angle of attack throughout plurality of fan blades. In some cases, misaligned propulsion system 116 and/or non-uniform inlet flow may result in cyclical structural load on plurality of fan blades. In other cases, misaligned propulsion system 116 and/or non-uniform inlet flow may also result in unfavorable vibration imparted to blended wing body aircraft.

With continued reference to FIG. 1, in some embodiments, favorable environment for propulsion system 116 may further include a region of a low flow speed across entry of propulsion system 116. In some cases, a compressible fluid entering propulsion system 116 may be less than Mach number of 1. In some cases, compressible fluid may be uniform inlet flow. As used in this disclosure, a "Mach number" is a dimensionless quantity in fluid dynamics representing a ratio of airflow velocity past a boundary to a local speed of sound. In a non-limiting example, at Mach number of 1, airflow speed of uniform inlet flow may be equal to the speed of sound at entry of propulsion system 116 of blended wing body aircraft. In some cases, plurality of fan blades of prime mover 120 within propulsion system 116 may be difficult to control when compressible fluid at a greater Mach number. In other cases, plurality of fan blades may operate most efficiently at a low Mach number and may allow prime mover 120 within propulsion system 116 generate more thrust for blended wing body aircraft. Additionally, or alternatively, in some embodiments, plurality of fan blades within propulsion system 116 may operate at a particular advance ratio. As used in this disclosure, an "advance ratio" is the ratio of airflow speed and a blade tip circumferential speed. In a non-limiting example, when blended wing body aircraft is traveling at high speed relative to air and fan of prime mover 120 within propulsion system 116 is rotating slowly, propulsion system 116 may include a high advance ratio. In another non-limiting example, when blended wing body aircraft is traveling at low speed relative to air and fan of prime mover 120 within propulsion system 116 is rotating at a high speed, propulsion system 116 may include a low advance ratio. Further, plurality of fan blades may operate at an airspeed, wherein the airspeed may be close to a vector sum of flow speed at entry of propulsion system 116 and blade tip circumferential speed.

Figure 2:
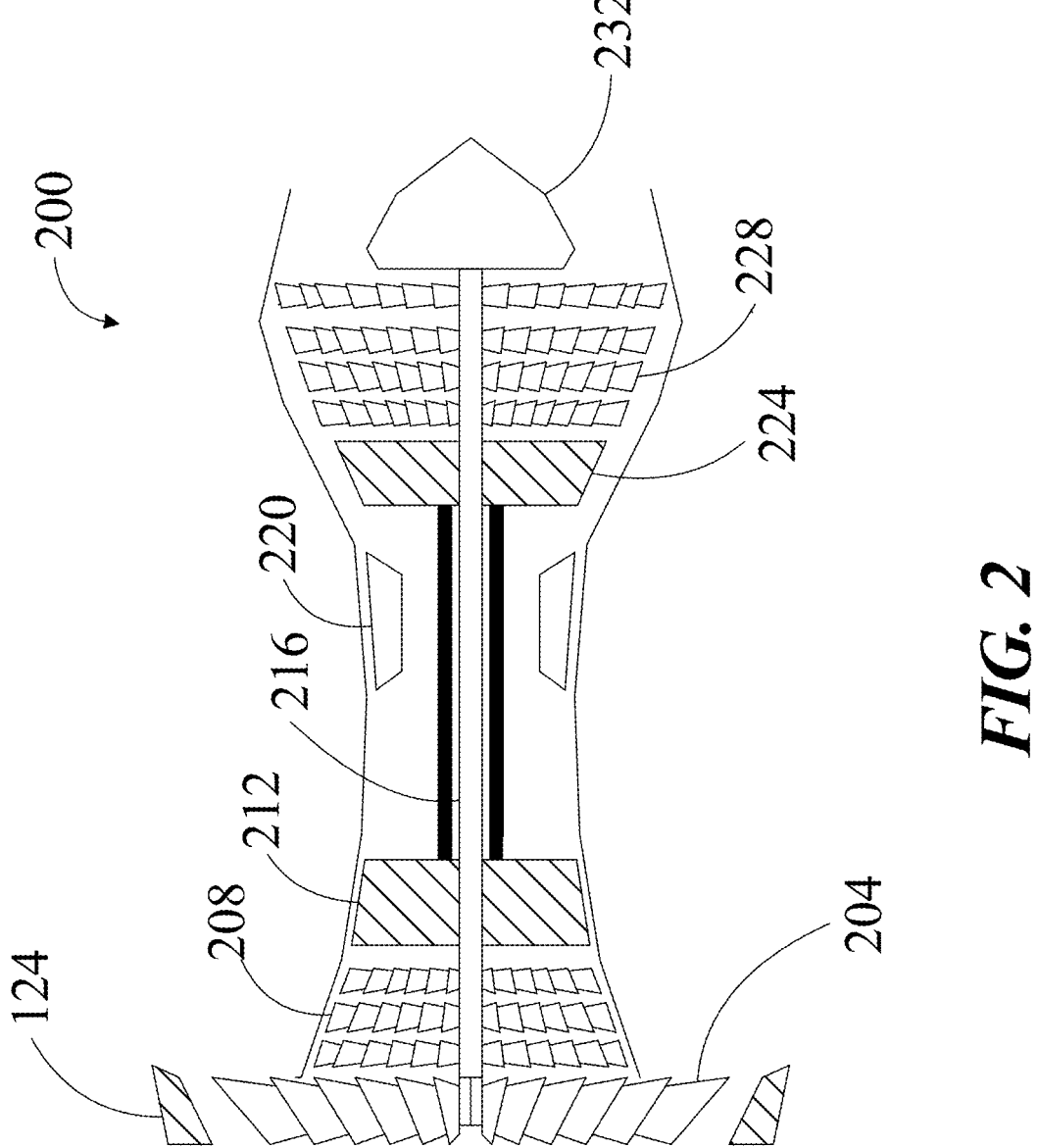
FIG. 2 is a cross-section view of an exemplary turbofan engine.

Referring to FIG. 2, an exemplary diagram of turbofan engine 200 is illustrated. In some embodiments, turbofan engine 200 may be located inside nacelle 124. Nacelle 124 may include any nacelle described above with reference to FIG. 1 in this disclosure. In some embodiments, turbofan engine 200 may include a fan 204, wherein the fan 204 rotates along with a fan shaft 216. In some cases, rotation of fan 204 and fan shaft 216 may be clockwise. In other cases, rotation of fan 204 and fan shaft may be counterclockwise. In some embodiments, fan 204 may include a plurality of fan blades. As used in this disclosure, a "fan shaft" is a rotating spindle on which fan 204 is mounted. In some embodiments, turbofan engine 200 may further include a plurality of air compressors. As used in this disclosure, an "air compressor" is a pneumatic device that converts power into potential energy stored in pressurized air. In some cases, air compressor may be gas turbine engine compressor. Gas turbine engine compressor may include, but is not limited to axial compressor, centrifugal compressor, mixed flow compressor, and the like thereof. In some embodiments, plurality of air compressors may include a low-pressure compressor 208, wherein the low-pressure compressor 208 increases pressure of airflow flow into turbofan engine 200 at a low pressure. In some embodiments, plurality of air compressors may further include a high-pressure compressor 212, wherein the high-pressure compressor 212 increase pressure of airflow flow into turbofan engine 200 at a high pressure. In some embodiments, plurality of air compressors may be mounted on a same shaft such as fan shaft 216. In other embodiments, each air compressor of plurality of air compressors may operate at a different speed.

With continued reference to FIG. 2, additionally, or alternatively, turbofan engine 200 may further include a combustion chamber 220. As used in this disclosure, a "combustion chamber" is an area within turbofan engine 200 where air is ignited. In some cases, combustion chamber 220 may inject fuel into airflow. Further, mixture of fuel and air may be combusted and pushed out of turbofan engine 200 in a form of energy. In some embodiments, turbofan engine 200 may further include a plurality of turbines. As used in this disclosure, a "turbine" is a device that convert energy in a stream of fluid into mechanical energy. In some cases, plurality of turbines may include a high-pressure turbine 224, wherein the high-pressure turbine 224 is a first turbine to receive airflow within turbofan engine 200 that efficiently extract work out of high-pressure airflow produced by plurality of compressors. In other cases, plurality of turbines may include a low-pressure turbine 228, wherein the low-pressure turbine 228 is a second turbine to receive airflow within turbofan engine 200 that efficiently extract work out of low-pressure airflow with a low-pressure ratio. In some cases, low-pressure turbine may minimize a negative impact on turbofan engine 200 performance caused by increased exhaust back pressure. Further, turbofan engine 200 may include a plug nozzle 232 at the end of turbofan engine 200, wherein the plug nozzle 232 is a type of nozzle which includes a center body or a plug around which the airflow exhausts. As will be appreciated by persons having ordinary skill in the art, after having read the entirety of this disclosure, the foregoing list is provided by way of example and components of turbofan engine 200 can be added as an extension or improving the system 100 disclosed herein.

Figure 3:
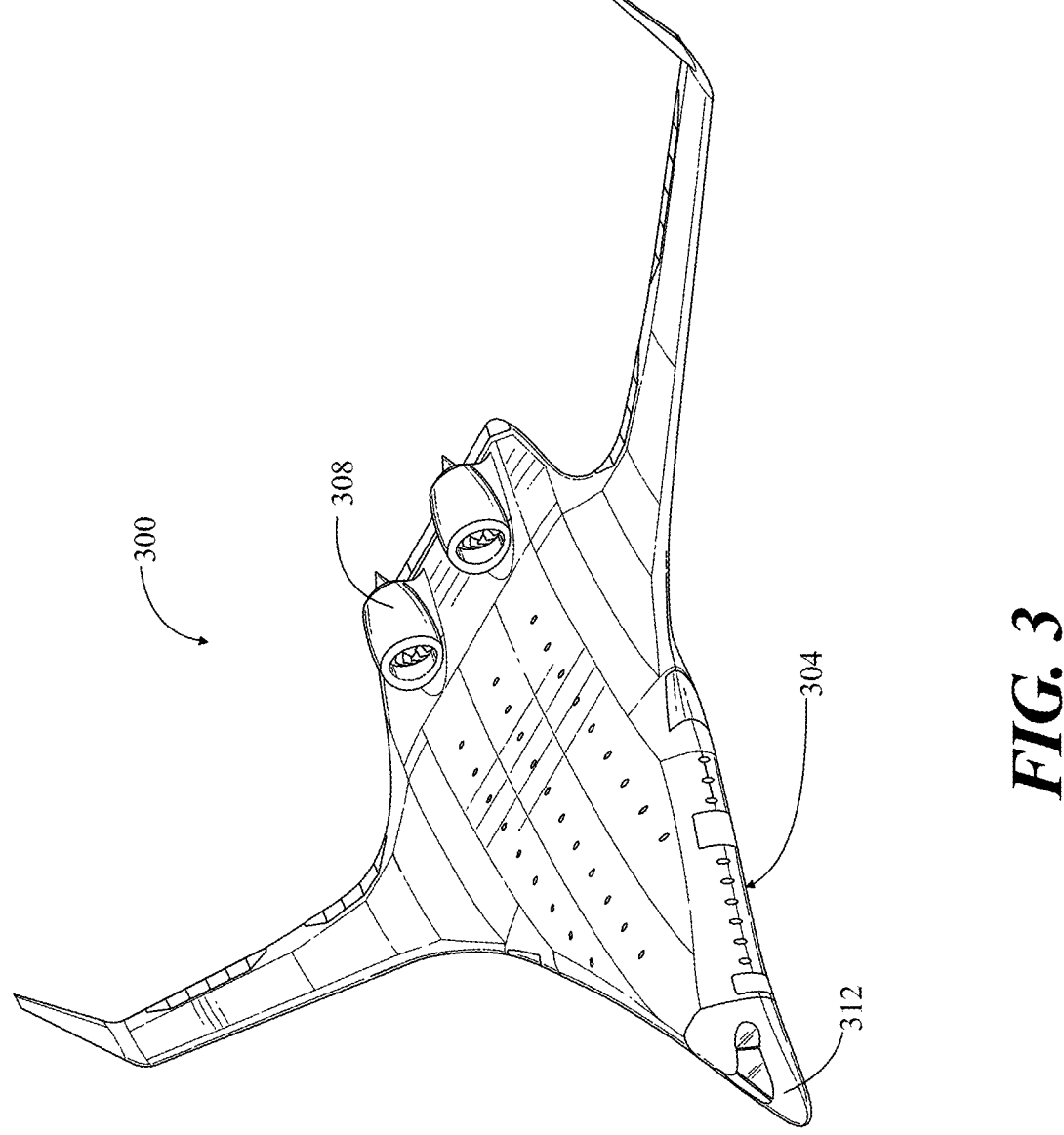
FIG. 3 is a schematic of an exemplary blended wing aircraft.

Referring to FIG. 3, an exemplary blended wing aircraft 300 is illustrated. Aircraft 300 may include a blended wing body 304. For the purposes of this disclosure, a "blended wing body aircraft" is an aircraft having a blended wing body. As used in this disclosure, A "blended wing body" (BWB), also known as a "blended body" or a "hybrid wing body" (HWB), is a fixed-wing aircraft body having no clear or abrupt demarcation between wings and a main body of the aircraft along a leading edge of the aircraft. For example, a BWB 304 aircraft may have distinct wing and body structures, which are smoothly blended together with no clear dividing line or boundary feature between wing and fuselage. This contrasts with a flying wing, which has no distinct fuselage, and a lifting body, which has no distinct wings. A BWB 304 design may or may not be tailless. One potential advantage of a BWB 304 may be to reduce wetted area and any accompanying drag associated with a conventional wing-body junction. In some cases, a BWB 304 may also have a wide airfoil-shaped body, allowing entire aircraft to generate lift and thereby facilitate reduction in size and/or drag of wings. In some cases, a BWB 304 may be understood as a hybrid shape that resembles a flying wing, but also incorporates features from conventional aircraft. In some cases, this combination may offer several advantages over conventional tube-and-wing airframes. In some cases, a BWB airframe 304 may help to increase fuel economy and create larger payload (cargo or passenger) volumes within the BWB. BWB 304 may allow for advantageous interior designs. For instance, cargo can be loaded and/or passengers can board from the front or rear of the aircraft. A cargo or passenger area may be distributed across a relatively wide (when compared to conventional tube-wing aircraft) fuselage, providing a large usable volume. In some embodiments, passengers seated within an interior of aircraft, real-time video at every seat can take place of window seats.

With continued reference to FIG. 3, BWB 304 of aircraft 300 may include a nose portion. A "nose portion," for the purposes of this disclosure, refers to any portion of aircraft 300 forward of the aircraft's fuselage 316. Nose portion may comprise a cockpit (for manned aircraft), canopy, aerodynamic fairings, windshield, and/or any structural elements required to support mechanical loads. Nose portion may also include pilot seats, control interfaces, gages, displays, inceptor sticks, throttle controls, collective pitch controls, and/or communication equipment, to name a few. Nose portion may comprise a swing nose configuration. A swing nose may be characterized by an ability of the nose to move, manually or automatedly, into a differing orientation than its flight orientation to provide an opening for loading a payload into aircraft fuselage from the front of the aircraft. Nose portion may be configured to open in a plurality of orientations and directions.

With continued reference to FIG. 3, BWB 304 may include at least a structural component of aircraft 300. Structural components may provide physical stability during an entirety of an aircraft's 300 flight envelope, while on ground, and during normal operation Structural components may comprise struts, beams, formers, stringers, longerons, interstitials, ribs, structural skin, doublers, straps, spars, or panels, to name a few. Structural components may also comprise pillars. In some cases, for the purpose of aircraft cockpits comprising windows/windshields, pillars may include vertical or near vertical supports around a window configured to provide extra stability around weak points in a vehicle's structure, such as an opening where a window is installed. Where multiple pillars are disposed in an aircraft's 300 structure, they may be so named A, B, C, and so on named from nose to tail. Pillars, like any structural element, may be disposed a distance away from each other, along an exterior of aircraft 300 and BWB 304. Depending on manufacturing method of BWB 304, pillars may be integral to frame and skin, comprised entirely of internal framing, or alternatively, may be only integral to structural skin elements. Structural skin will be discussed in greater detail below.

With continued reference to FIG. 3, BWB 304 may include a plurality of materials, alone or in combination, in its construction. At least a BWB 304, in an illustrative embodiment may include a welded steel tube frame further configured to form a general shape of a nose corresponding to an arrangement of steel tubes. Steel may include any of a plurality of alloyed metals, including but not limited to, a varying amount of manganese, nickel, copper, molybdenum, silicon, and/or aluminum, to name a few. Welded steel tubes may be covered in any of a plurality of materials suitable for aircraft skin. Some of these may include carbon fiber, fiberglass panels, cloth-like materials, aluminum sheeting, or the like. BWB 304 may comprise aluminum tubing mechanically coupled in various and orientations. Mechanical fastening of aluminum members (whether pure aluminum or alloys) may comprise temporary or permanent mechanical fasteners appreciable by one of ordinary skill in the art including, but not limited to, screws, nuts and bolts, anchors, clips, welding, brazing, crimping, nails, blind rivets, pull-through rivets, pins, dowels, snap-fits, clamps, and the like. BWB 304 may additionally or alternatively use wood or another suitably strong yet light material for an internal structure.

With continued reference to FIG. 3, aircraft 300 may include monocoque or semi-monocoque construction. BWB 304 may include carbon fiber. Carbon fiber may include carbon fiber reinforced polymer, carbon fiber reinforced plastic, or carbon fiber reinforced thermoplastic (e.g., CFRP, CRP, CFRTP, carbon composite, or just carbon, depending on industry). "Carbon fiber," as used in this disclosure, is a composite material including a polymer reinforced with carbon. In general, carbon fiber composites consist of two parts, a matrix and a reinforcement. In carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each comprise a diameter between 5-10 micrometers and include a high percentage (i.e. above 85%) of carbon atoms. A person of ordinary skill in the art will appreciate that the advantages of carbon fibers include high stiffness, high tensile strength, low weight, high chemical resistance, high temperature tolerance, and low thermal expansion. According to embodiments, carbon fibers may be combined with other materials to form a composite, when permeated with plastic resin and baked, carbon fiber reinforced polymer becomes extremely rigid. Rigidity may be considered analogous to stiffness which may be measured using Young's Modulus. Rigidity may be defined as a force necessary to bend and/or flex a material and/or structure to a given degree. For example, ceramics have high rigidity, which can be visualized by shattering before bending. In embodiments, carbon fibers may additionally, or alternatively, be composited with other materials like graphite to form reinforced carbon-carbon composites, which include high heat tolerances over 2000° C. A person of skill in the art will further appreciate that aerospace applications may require high-strength, low-weight, high heat resistance materials in a plurality of roles, such as without limitation fuselages, fairings, control surfaces, and structures, among others.

With continued reference to FIG. 3, BWB 304 may include at least a fuselage. A "fuselage," for the purposes of this disclosure, refers to a main body of an aircraft 300, or in other words, an entirety of the aircraft 300 except for nose, wings, empennage, nacelles, and control surfaces. In some cases, fuselage may contains an aircraft's payload. At least a fuselage may comprise structural components that physically support a shape and structure of an aircraft 300. Structural components may take a plurality of forms, alone or in combination with other types. Structural components vary depending on construction type of aircraft 300 and specifically, fuselage. A fuselage 312 may include a truss structure. A truss structure may be used with a lightweight aircraft. A truss structure may include welded steel tube trusses. A "truss," as used in this disclosure, is an assembly of beams that create a rigid structure, for example without limitation including combinations of triangles to create three-dimensional shapes. A truss structure may include wood construction in place of steel tubes, or a combination thereof. In some embodiments, structural components can comprise steel tubes and/or wood beams. An aircraft skin may be layered over a body shape constructed by trusses. Aircraft skin may comprise a plurality of materials such as plywood sheets, aluminum, fiberglass, and/or carbon fiber.

With continued reference to FIG. 3, in embodiments, at least a fuselage may comprise geodesic construction. Geodesic structural elements may include stringers wound about formers (which may be alternatively called station frames) in opposing spiral directions. A "stringer," for the purposes of this disclosure is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along a length of an interior of a fuselage orthogonal to a longitudinal (nose to tail) axis of aircraft 300. In some cases, a former forms a general shape of at least a fuselage. A former may include differing cross-sectional shapes at differing locations along a fuselage, as the former is a structural component that informs an overall shape of the fuselage. In embodiments, aircraft skin can be anchored to formers and strings such that an outer mold line of volume encapsulated by the formers and stringers comprises a same shape as aircraft 300 when installed. In other words, former(s) may form a fuselage's ribs, and stringers may form interstitials between the ribs. A spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

With continued reference to FIG. 3, according to some embodiments, a fuselage can comprise monocoque construction. Monocoque construction can include a primary structure that forms a shell (or skin in an aircraft's case) and supports physical loads. Monocoque fuselages are fuselages in which the aircraft skin or shell may also include a primary structure. In monocoque construction aircraft skin would support tensile and compressive loads within itself and true monocoque aircraft can be further characterized by an absence of internal structural elements. Aircraft skin in this construction method may be rigid and can sustain its shape with substantially no structural assistance form underlying skeleton-like elements. Monocoque fuselage may include aircraft skin made from plywood layered in varying grain directions, epoxy-impregnated fiberglass, carbon fiber, or any combination thereof.

With continued reference to FIG. 3, according to some embodiments, a fuselage may include a semi-monocoque construction. Semi-monocoque construction, as used in this disclosure, is used interchangeably with partially monocoque construction, discussed above. In semi-monocoque construction, a fuselage may derive some structural support from stressed aircraft skin and some structural support from underlying frame structure made of structural components. Formers or station frames can be seen running transverse to a long axis of fuselage with circular cutouts which are may be used in real-world manufacturing for weight savings and for routing of electrical harnesses and other modern on-board systems. In a semi-monocoque construction, stringers may be thin, long strips of material that run parallel to a fuselage's long axis. Stringers can be mechanically coupled to formers permanently, such as with rivets. Aircraft skin can be mechanically coupled to stringers and formers permanently, such as by rivets as well. A person of ordinary skill in the art will appreciate that there are numerous methods for mechanical fastening of the aforementioned components like screws, nails, dowels, pins, anchors, adhesives like glue or epoxy, or bolts and nuts, to name a few. According to some embodiments, a subset of semi-monocoque construction may be unibody construction. Unibody, which is short for "unitized body" or alternatively "unitary construction", vehicles are characterized by a construction in which body, floor plan, and chassis form a single structure, for example an automobile. In the aircraft world, a unibody may include internal structural elements, like formers and stringers, constructed in one piece, integral to an aircraft skin. In some cases, stringers and formers may account for a bulk of any aircraft structure (excluding monocoque construction). Stringers and formers can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin may be transferred to stringers. Location of said stringers greatly informs type of forces and loads applied to each and every stringer, all of which may be accounted for through design processes including, material selection, cross-sectional area, and mechanical coupling methods of each member. Similar methods may be performed for former assessment and design. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

With continued reference to FIG. 3, in some cases, a primary purpose for a substructure of a semi-monocoque structure is to stabilize a skin. Typically, aircraft structure is required to have a very light weight and as a result, in some cases, aircraft skin may be very thin. In some cases, unless supported, this thin skin structure may tend to buckle and/or cripple under compressive and/or shear loads. In some cases, underlying structure may be primarily configured to stabilize skins. For example, in an exemplary conventional airliner, wing structure is an airfoil-shaped box with truncated nose and aft triangle; without stabilizing substructure, in some cases, this box would buckle upper skin of the wing and the upper skin would also collapse into the lower skin under bending loads. In some cases, deformations are prevented with ribs that support stringers which stabilize the skin. Fuselages are similar with bulkheads or frames, and stringers.

With continued reference to FIG. 3, in some embodiments, another common structural form is sandwich structure. As used in this disclosure, "sandwich structure" includes a skin structure having an inner and outer skin separated and stabilized by a core material. In some cases, sandwich structure may additionally include some number of ribs or frames. In some cases, sandwich structure may include metal, polymer, and/or composite. In some cases, core material may include honeycomb, foam plastic, and/or end-grain balsa wood. In some cases, sandwich structure can be popular on composite light airplanes, such as gliders and powered light planes. In some cases, sandwich structure may not use stringers, and sandwich structure may allow number of ribs or frames to be reduced, for instance in comparison with a semi-monocoque structure. In some cases, sandwich structure may be suitable for smaller, possibly unmanned, unpressurized blended wing body aircraft.

With continued reference to FIG. 3, stressed skin, when used in semi-monocoque construction, may bear partial, yet significant, load. In other words, an internal structure, whether it be a frame of welded tubes, formers and stringers, or some combination, is not sufficiently strong enough by design to bear all loads. The concept of stressed skin is applied in monocoque and semi-monocoque construction methods of at least a fuselage and/or BWB 304. In some cases, monocoque may be considered to include substantially only structural skin, and in that sense, aircraft skin undergoes stress by applied aerodynamic fluids imparted by fluid. Stress as used in continuum mechanics can be described in pound-force per square inch ($lbf/in^2$) or Pascals (Pa). In semi-monocoque construction stressed skin bears part of aerodynamic loads and additionally imparts force on an underlying structure of stringers and formers.

With continued reference to FIG. 3, a fuselage may include an interior cavity. An interior cavity may include a volumetric space configurable to house passenger seats and/or cargo. An interior cavity may be configured to include receptacles for fuel tanks, batteries, fuel cells, or other energy sources as described herein. In some cases, a post may be supporting a floor (i.e., deck), or in other words a surface on which a passenger, operator, passenger, payload, or other object would rest on due to gravity when within an aircraft 300 is in its level flight orientation or sitting on ground. A post may act similarly to stringer in that it is configured to support axial loads in compression due to a load being applied parallel to its axis due to, for example, a heavy object being placed on a floor of aircraft 300. A beam may be disposed in or on any portion a fuselage that requires additional bracing, specifically when disposed transverse to another structural element, like a post, that would benefit from support in that direction, opposing applied force. A beam may be disposed in a plurality of locations and orientations within a fuselage as necessitated by operational and constructional requirements.

With continued reference to FIG. 3, aircraft 300 may include at least a flight component 308. A flight component 308 may be consistent with any description of a flight component described in this disclosure, such as without limitation propulsors, control surfaces, rotors, paddle wheels, engines, propellers, wings, winglets, or the like. For the purposes of this disclosure, at least a "flight component" is at least one element of an aircraft 300 configured to manipulate a fluid medium such as air to propel, control, or maneuver an aircraft. In nonlimiting examples, at least a flight component may include a rotor mechanically connected to a rotor shaft of an electric motor further mechanically affixed to at least a portion of aircraft 300. In some embodiments, at least a flight component 308 may include a propulsor, for example a rotor attached to an electric motor configured to produce shaft torque and in turn, create thrust. As used in this disclosure, an "electric motor" is an electrical machine that converts electric energy into mechanical work.

With continued reference to FIG. 3, for the purposes of this disclosure, "torque", is a twisting force that tends to cause rotation. Torque may be considered an effort and a rotational analogue to linear force. A magnitude of torque of a rigid body may depend on three quantities: a force applied, a lever arm vector connecting a point about which the torque is being measured to a point of force application, and an angle between the force and the lever arm vector. A force applied perpendicularly to a lever multiplied by its distance from the lever's fulcrum (the length of the lever arm) is its torque. A force of three newtons applied two meters from the fulcrum, for example, exerts the same torque as a force of one newton applied six meters from the fulcrum. In some cases, direction of a torque can be determined by using a right-hand grip rule which states: if fingers of right hand are curled from a direction of lever arm to direction of force, then thumb points in a direction of the torque. One of ordinary skill in the art would appreciate that torque may be represented as a vector, consistent with this disclosure, and therefore may include a magnitude and a direction. "Torque" and "moment" are used interchangeably within this disclosure. Any torque command or signal within this disclosure may include at least the steady state torque to achieve the torque output to at least a propulsor.

With continued reference to FIG. 3, at least a flight component may be one or more devices configured to affect aircraft's 300 attitude. "Attitude", for the purposes of this disclosure, is the relative orientation of a body, in this case aircraft 300, as compared to earth's surface or any other reference point and/or coordinate system. In some cases, attitude may be displayed to pilots, personnel, remote users, or one or more computing devices in an attitude indicator, such as without limitation a visual representation of a horizon and its relative orientation to aircraft 300. A plurality of attitude datums may indicate one or more measurements relative to an aircraft's pitch, roll, yaw, or throttle compared to a relative starting point. One or more sensors may measure or detect an aircraft's 300 attitude and establish one or more attitude datums. An "attitude datum", for the purposes of this disclosure, refers to at least an element of data identifying an attitude of an aircraft 300.

With continued reference to FIG. 3, in some cases, aircraft 300 may include one or more of an angle of attack sensor and a yaw sensor. In some embodiments, one or more of an angle of attack sensor and a yaw sensor may include a vane (e.g., wind vane). In some cases, vane may include a protrusion on a pivot with an aft tail. The protrusion may be configured to rotate about pivot to maintain zero tail angle of attack. In some cases, pivot may turn an electronic device that reports one or more of angle of attack and/or yaw, depending on, for example, orientation of the pivot and tail. Alternatively or additionally, in some cases, one or more of angle of attack sensor and/or yaw sensor may include a plurality of pressure ports located in selected locations, with pressure sensors located at each pressure port. In some cases, differential pressure between pressure ports can be used to estimate angle of attack and/or yaw.

With continued reference to FIG. 3, in some cases, aircraft 300 may include at least a pilot control. As used in this disclosure, a "pilot control," is an interface device that allows an operator, human or machine, to control a flight component of an aircraft. Pilot control may be communicatively connected to any other component presented in aircraft 300, the communicative connection may include redundant connections configured to safeguard against single-point failure. In some cases, a plurality of attitude datums may indicate a pilot's instruction to change heading and/or trim of an aircraft 300. Pilot input may indicate a pilot's instruction to change an aircraft's pitch, roll, yaw, throttle, and/or any combination thereof. Aircraft trajectory may be manipulated by one or more control surfaces and propulsors working alone or in tandem consistent with the entirety of this disclosure. "Pitch", for the purposes of this disclosure refers to an aircraft's angle of attack, that is a difference between a plane including at least a portion of both wings of the aircraft running nose to tail and a horizontal flight trajectory. For example, an aircraft may pitch "up" when its nose is angled upward compared to horizontal flight, as in a climb maneuver. In another example, an aircraft may pitch "down", when its nose is angled downward compared to horizontal flight, like in a dive maneuver. In some cases, angle of attack may not be used as an input, for instance pilot input, to any system disclosed herein; in such circumstances proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, that is to say that when an aircraft rotates about its axis from its tail to its nose, and one side rolls upward, as in a banking maneuver. "Yaw", for the purposes of this disclosure, refers to an aircraft's turn angle, when an aircraft rotates about an imaginary vertical axis intersecting center of earth and aircraft 300. "Throttle", for the purposes of this disclosure, refers to an aircraft outputting an amount of thrust from a propulsor. In context of a pilot input, throttle may refer to a pilot's input to increase or decrease thrust produced by at least a propulsor. Flight components 308 may receive and/or transmit signals, for example an aircraft command signal. Aircraft command signal may include any signal described in this disclosure, such as without limitation electrical signal, optical signal, pneumatic signal, hydraulic signal, and/or mechanical signal. In some cases, an aircraft command may be a function of a signal from a pilot control. In some cases, an aircraft command may include or be determined as a function of a pilot command. For example, aircraft commands may be determined as a function of a mechanical movement of a throttle. Signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Pilot control may include circuitry, computing devices, electronic components or a combination thereof that translates pilot input into a signal configured to be transmitted to another electronic component. In some cases, a plurality of attitude commands may determined as a function of an input to a pilot control. A plurality of attitude commands may include a total attitude command datum, such as a combination of attitude adjustments represented by one or a certain number of combinatorial datums. A plurality of attitude commands may include individual attitude datums representing total or relative change in attitude measurements relative to pitch, roll, yaw, and throttle.

With continued reference to FIG. 3, in some embodiments, pilot control may include at least a sensor. As used in this disclosure, a "sensor" is a device that detects a phenomenon. In some cases, a sensor may detect a phenomenon and transmit a signal that is representative of the phenomenon. At least a sensor may include, torque sensor, gyroscope, accelerometer, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. For the purposes of the disclosure, a "torque datum" is one or more elements of data representing one or more parameters detailing power output by one or more propulsors, flight components, or other elements of an electric aircraft. A torque datum may indicate the torque output of at least a flight component 308. At least a flight component 308 may include any propulsor as described herein. In embodiment, at least a flight component 308 may include an electric motor, a propeller, a jet engine, a paddle wheel, a rotor, turbine, or any other mechanism configured to manipulate a fluid medium to propel an aircraft as described herein. an embodiment of at least a sensor may include or be included in, a sensor suite. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a battery management system and/or user to detect phenomenon is maintained and in a non-limiting example, a user alter aircraft usage pursuant to sensor readings.

With continued reference to FIG. 3, at least a sensor may include a moisture sensor. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. A moisture sensor may be psychrometer. A moisture sensor may be a hygrometer. A moisture sensor may be configured to act as or include a humidistat. A "humidistat", for the purposes of this disclosure, is a humidity-triggered switch, often used to control another electronic device. A moisture sensor may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 3, at least a sensor may include electrical sensors. An electrical sensor may be configured to measure voltage across a component, electrical current through a component, and resistance of a component. Electrical sensors may include separate sensors to measure each of the previously disclosed electrical characteristics such as voltmeter, ammeter, and ohmmeter, respectively. One or more sensors may be communicatively coupled to at least a pilot control, the manipulation of which, may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor", for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

With continued reference to FIG. 3, at least a flight component 308 may include wings, empennages, nacelles, control surfaces, fuselages, and landing gear, among others, to name a few. In embodiments, an empennage may be disposed at the aftmost point of an aircraft body 304. Empennage may comprise a tail of aircraft 300, further comprising rudders, vertical stabilizers, horizontal stabilizers, stabilators, elevators, trim tabs, among others. At least a portion of empennage may be manipulated directly or indirectly by pilot commands to impart control forces on a fluid in which the aircraft 300 is flying. Manipulation of these empennage control surfaces may, in part, change an aircraft's heading in pitch, roll, and yaw. Wings comprise may include structures which include airfoils configured to create a pressure differential resulting in lift. Wings are generally disposed on a left and right side of aircraft 300 symmetrically, at a point between nose and empennage. Wings may comprise a plurality of geometries in planform view, swept swing, tapered, variable wing, triangular, oblong, elliptical, square, among others. Wings may be blended into the body of the aircraft such as in a BWB 304 aircraft 300 where no strong delineation of body and wing exists. A wing's cross section geometry may comprise an airfoil. An "airfoil" as used in this disclosure, is a shape specifically designed such that a fluid flowing on opposing sides of it exert differing levels of pressure against the airfoil. In embodiments, a bottom surface of an aircraft can be configured to generate a greater pressure than does a top surface, resulting in lift. A wing may comprise differing and/or similar cross-sectional geometries over its cord length, e.g. length from wing tip to where wing meets the aircraft's body. One or more wings may be symmetrical about an aircraft's longitudinal plane, which comprises a longitudinal or roll axis reaching down a center of the aircraft through the nose and empennage, and the aircraft's yaw axis. In some cases, wings may comprise controls surfaces configured to be commanded by a pilot and/or autopilot to change a wing's geometry and therefore its interaction with a fluid medium. Flight component 308 may include control surfaces. Control surfaces may include without limitation flaps, ailerons, tabs, spoilers, and slats, among others. In some cases, control surfaces may be disposed on wings in a plurality of locations and arrangements. In some cases, control surfaces may be disposed at leading and/or trailing edges of wings, and may be configured to deflect up, down, forward, aft, or any combination thereof.

In some cases, flight component 308 may include a winglet. For the purposes of this disclosure, a "winglet" is a flight component configured to manipulate a fluid medium and is mechanically attached to a wing or aircraft and may alternatively called a "wingtip device." Wingtip devices may be used to improve efficiency of fixed-wing aircraft by reducing drag. Although there are several types of wingtip devices which function in different manners, their intended effect may be to reduce an aircraft's drag by partial recovery of tip vortex energy. Wingtip devices can also improve aircraft handling characteristics and enhance safety for aircraft 300. Such devices increase an effective aspect ratio of a wing without greatly increasing wingspan. Extending wingspan may lower lift-induced drag, but would increase parasitic drag and would require boosting the strength and weight of the wing. As a result according to some aeronautic design equations, a maximum wingspan made be determined above which no net benefit exits from further increased span. There may also be operational considerations that limit the allowable wingspan (e.g., available width at airport gates).

Wingtip devices, in some cases, may increase lift generated at wingtip (by smoothing airflow across an upper wing near the wingtip) and reduce lift-induced drag caused by wingtip vortices, thereby improving a lift-to-drag ratio. This increases fuel efficiency in powered aircraft and increases cross-country speed in gliders, in both cases increasing range. U.S. Air Force studies indicate that a given improvement in fuel efficiency correlates directly and causally with increase in an aircraft's lift-to-drag ratio. The term "winglet" has previously been used to describe an additional lifting surface on an aircraft, like a short section between wheels on fixed undercarriage. An upward angle (i.e., cant) of a winglet, its inward or outward angle (i.e., toe), as well as its size and shape are selectable design parameters which may be chosen for correct performance in a given application. A wingtip vortex, which rotates around from below a wing, strikes a cambered surface of a winglet, generating a force that angles inward and slightly forward. A winglet's relation to a wingtip vortex may be considered analogous to sailboat sails when sailing to windward (i.e., close-hauled). Similar to the close-hauled sailboat's sails, winglets may convert some of what would otherwise-be wasted energy in a wingtip vortex to an apparent thrust. This small contribution can be worthwhile over the aircraft's lifetime. Another potential benefit of winglets is that they may reduce an intensity of wake vortices. Wake vortices may trail behind an aircraft 300 and pose a hazard to other aircraft. Minimum spacing requirements between aircraft at airports are largely dictated by hazards, like those from wake vortices. Aircraft are classified by weight (e.g., "Light," "Heavy," and the like) often base upon vortex strength, which grows with an aircraft's lift coefficient. Thus, associated turbulence is greatest at low speed and high weight, which may be produced at high angle of attack near airports. Winglets and wingtip fences may also increase efficiency by reducing vortex interference with laminar airflow near wingtips, by moving a confluence of low-pressure air (over wing) and high-pressure air (under wing) away from a surface of the wing. Wingtip vortices create turbulence, which may originate at a leading edge of a wingtip and propagate backwards and inboard. This turbulence may delaminate airflow over a small triangular section of an outboard wing, thereby frustrating lift in that area. A fence/winglet drives an area where a vortex forms upward away from a wing surface, as the resulting vortex is repositioned to a top tip of the winglet.

With continued reference to FIG. 3, aircraft 300 may include an energy source. Energy source may include any device providing energy to at least a flight component 308, for example at least a propulsors. Energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a battery, a capacitor, and/or inductor. The energy source and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode. In embodiments, the energy source may be used to provide electrical power to an electric or hybrid propulsor during moments requiring high rates of power output, including without limitation takeoff, landing, thermal de-icing and situations requiring greater power output for reasons of stability, such as high turbulence situations. In some cases, battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. A person of ordinary skill in the art, upon reviewing the entirety of this disclosure, will be aware of various devices of components that may be used as an energy source.

With continued reference to FIG. 3, in further nonlimiting embodiments, an energy source may include a fuel store. As used in this disclosure, a "fuel store" is an aircraft component configured to store a fuel. In some cases, a fuel store may include a fuel tank. Fuel may include a liquid fuel, a gaseous fluid, a solid fuel, and fluid fuel, a plasma fuel, and the like. As used in this disclosure, a "fuel" may include any substance that stores energy. Exemplary non-limiting fuels include hydrocarbon fuels, petroleum-based fuels, synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. As described in greater detail below fuel store may be located substantially within blended wing body 304 of aircraft 300, for example without limitation within a wing portion 312 of blended wing body 308. Aviation fuels may include petroleum-based fuels, or petroleum and synthetic fuel blends, used to power aircraft 300. In some cases, aviation fuels may have more stringent requirements than fuels used for ground use, such as heating and road transport. Aviation fuels may contain additives to enhance or maintain properties important to fuel performance or handling. Fuel may be kerosene-based (JP-8 and Jet A-1), for example for gas turbine-powered aircraft. Piston-engine aircraft may use gasoline-based fuels and/or kerosene-based fuels (for example for Diesel engines). In some cases, specific energy may be considered an important criterion in selecting fuel for an aircraft 300. Liquid fuel may include Jet-A. Presently Jet-A powers modern commercial airliners and is a mix of extremely refined kerosene and burns at temperatures at or above 49° C. (120° F.). Kerosene-based fuel has a much higher flash point than gasoline-based fuel, meaning that it requires significantly higher temperature to ignite.

With continued reference to FIG. 3, modular aircraft 300 may include an energy source which may include a fuel cell. As used in this disclosure, a "fuel cell" is an electrochemical device that combines a fuel and an oxidizing agent to create electricity. In some cases, fuel cells are different from most batteries in requiring a continuous source of fuel and oxygen (usually from air) to sustain the chemical reaction, whereas in a battery the chemical energy comes from metals and their ions or oxides that are commonly already present in the battery, except in flow batteries. Fuel cells can produce electricity continuously for as long as fuel and oxygen are supplied.

With continued reference to FIG. 3, in some embodiments, fuel cells may consist of different types. Commonly a fuel cell consists of an anode, a cathode, and an electrolyte that allows ions, often positively charged hydrogen ions (protons), to move between two sides of the fuel cell. At anode, a catalyst causes fuel to undergo oxidation reactions that generate ions (often positively charged hydrogen ions) and electrons. Ions move from anode to cathode through electrolyte. Concurrently, electrons may flow from anode to cathode through an external circuit, producing direct current electricity. At cathode, another catalyst causes ions, electrons, and oxygen to react, forming water and possibly other products. Fuel cells may be classified by type of electrolyte used and by difference in startup time ranging from 3 second for proton-exchange membrane fuel cells (PEM fuel cells, or PEMFC) to 10 minutes for solid oxide fuel cells (SOFC). In some cases, energy source may include a related technology, such as flow batteries. Within a flow battery fuel can be regenerated by recharging. Individual fuel cells produce relatively small electrical potentials, about 0.7 volts. Therefore, in some cases, fuel cells may be "stacked", or placed in series, to create sufficient voltage to meet an application's requirements. In addition to electricity, fuel cells may produce water, heat and, depending on the fuel source, very small amounts of nitrogen dioxide and other emissions. Energy efficiency of a fuel cell is generally between 40 and 90%.

Fuel cell may include an electrolyte. In some cases, electrolyte may define a type of fuel cell. Electrolyte may include any number of substances like potassium hydroxide, salt carbonates, and phosphoric acid. Commonly a fuel cell is fueled by hydrogen. Fuel cell may feature an anode catalyst, like fine platinum powder, which breaks down fuel into electrons and ions. Fuel cell may feature a cathode catalyst, often nickel, which converts ions into waste chemicals, with water being the most common type of waste. A fuel cell may include gas diffusion layers that are designed to resist oxidization.

With continued reference to FIG. 3, aircraft 300 may include an energy source which may include a cell such as a battery cell, or a plurality of battery cells making a battery module. An energy source may be a plurality of energy sources. The module may include batteries connected in parallel or in series or a plurality of modules connected either in series or in parallel designed to deliver both the power and energy requirements of the application. Connecting batteries in series may increase the voltage of an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of an energy source may be based on the individual battery cell performance or an extrapolation based on the measurement of at least an electrical parameter. In an embodiment where an energy source includes a plurality of battery cells, the overall power output capacity may be dependent on the electrical parameters of each individual cell. If one cell experiences high self-discharge during demand, power drawn from an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

With continued reference to FIG. 3, aircraft 300 may include multiple flight component 308 sub-systems, each of which may have a separate energy source. For instance, and without limitation, one or more flight components 308 may have a dedicated energy source. Alternatively, or additionally, a plurality of energy sources may each provide power to two or more flight components 308, such as, without limitation, a "fore" energy source providing power to flight components located toward a front of an aircraft 300, while an "aft" energy source provides power to flight components located toward a rear of the aircraft 300. As a further non-limiting example, a flight component of group of flight components may be powered by a plurality of energy sources. For example, and without limitation, two or more energy sources may power one or more flight components; two energy sources may include, without limitation, at least a first energy source having high specific energy density and at least a second energy source having high specific power density, which may be selectively deployed as required for higher-power and lower-power needs. Alternatively, or additionally, a plurality of energy sources may be placed in parallel to provide power to the same single propulsor or plurality of propulsors 308. Alternatively, or additionally, two or more separate propulsion subsystems may be joined using intertie switches (not shown) causing the two or more separate propulsion subsystems to be treatable as a single propulsion subsystem or system, for which potential under load of combined energy sources may be used as the electric potential. Persons skilled in the art, upon reviewing the entirety of this disclosure, will be aware of various combinations of energy sources that may each provide power to single or multiple propulsors in various configurations.

With continued reference to FIG. 3, aircraft 300 may include a flight component 308 that includes at least a nacelle 308. When attached by a pylon entirely outside an airframe 304 a nacelle may sometimes be referred to as a pod, in which case an engine within the nacelle may be referred to as a podded engine. In some cases an aircraft cockpit may also be housed in a nacelle, rather than in a conventional fuselage. At least a nacelle may substantially encapsulate a propulsor, which may include a motor or an engine. At least a nacelle may be mechanically connected to at least a portion of aircraft 300 partially or wholly enveloped by an outer mold line of the aircraft 300. At least a nacelle may be designed to be streamlined. At least a nacelle may be asymmetrical about a plane comprising the longitudinal axis of the engine and the yaw axis of modular aircraft 300.

With continued reference to FIG. 3, a flight component may include a propulsor. A "propulsor," as used herein, is a component or device used to propel a craft by exerting force on a fluid medium, which may include a gaseous medium such as air or a liquid medium such as water. For the purposes of this disclosure, "substantially encapsulate" is the state of a first body (e.g., housing) surrounding all or most of a second body. A motor may include without limitation, any electric motor, where an electric motor is a device that converts electrical energy into mechanical work for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a flight controller and/or a computing device; computing device may include any computing device as described in this disclosure, including without limitation, a flight controller.

With continued reference to FIG. 3, a motor may be connected to a thrust element. Thrust element may include any device or component that converts mechanical work, for example of a motor or engine, into thrust in a fluid medium. Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element. A thrust element may include any device or component that converts mechanical energy (i.e., work) of a motor, for instance in form of rotational motion of a shaft, into thrust within a fluid medium. As another non-limiting example, a thrust element may include an eight-bladed pusher propeller, such as an eight-bladed propeller mounted behind the engine to ensure the drive shaft is in compression.

With continued reference to FIG. 3, in nonlimiting embodiments, at least a flight component 308 may include an airbreathing engine such as a jet engine, turbojet engine, turboshaft engine, ramjet engine, scramjet engine, hybrid propulsion system, turbofan engine, or the like. At least a flight component 308 may be fueled by any fuel described in this disclosure, for instance without limitation Jet-A, Jet-B, diesel fuel, gasoline, or the like. In nonlimiting embodiments, a jet engine is a type of reaction engine discharging a fast-moving jet that generates thrust by jet propulsion. While this broad definition can include rocket, water jet, and hybrid propulsion, the term jet engine, in some cases, refers to an internal combustion airbreathing jet engine such as a turbojet, turbofan, ramjet, or pulse jet. In general, jet engines are internal combustion engines. As used in this disclosure, a "combustion engine" is a mechanical device that is configured to convert mechanical work from heat produced by combustion of a fuel. In some cases, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine may include an internal combustion engine. An internal combustion engine may includes heat engine in which combustion of fuel occurs with an oxidizer (usually air) in a combustion chamber that comprises a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. In nonlimiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In some cases, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include are turbofans. Alternatively and/or additionally, jet engine may include a turbojets. In some cases, a turbofan may use a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element.

With continued reference to FIG. 3, an aircraft 300 may include a flight controller. As used in this disclosure, a "flight controller" is a device that generates signals for controlling at least a flight component 308 of an aircraft 300. In some cases, a flight controller includes electronic circuitry, such as without limitation a digital signal processor (DSP), an application-specific integrated circuit (ASIC), and/or a computing device. Flight controller may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used and described in this disclosure.

With continued reference to FIG. 3, computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 300 and/or computing device.

With continued reference to FIG. 3, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 4:
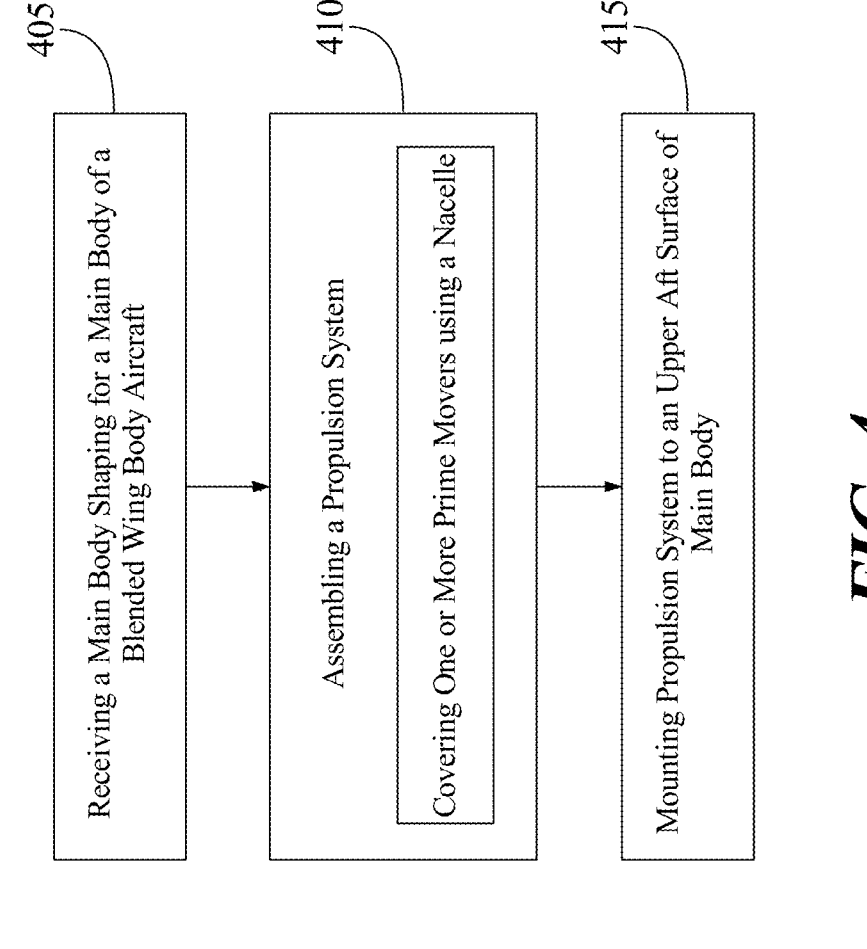
FIG. 4 is a flow diagram illustrating an exemplary method of manufacture of a system for providing favorable environment for propulsion system of blended wing body aircraft.

Referring now to FIG. 4, an exemplary method 400 of manufacture of a system for providing favorable environment for propulsion system of a blended wing body aircraft. Blended wing body aircraft may be any of the blended wing body aircrafts described herein with reference to FIGS. 1-3. In some embodiments, blended wing body aircrafts may include a main body. This may be implemented, without limitation, as described above in reference to FIGS. 1-3.

With continued reference to FIG. 4, at step 405, method 400 includes receiving a main body shaping for main body of a blended wing body aircraft. This may be implemented, without limitation, as described above in reference to FIGS. 1-3. Main body shaping further include an upper aft surface configured to provide a favorable environment for propulsion system of blended wing body aircraft. This may be implemented, without limitation, as described above in reference to FIGS. 1-3. In some embodiments, main body may further include an upper fore surface, wherein the upper fore surface may include an upper fore surface shaping. In some embodiments, upper fore surface shaping may be configured to create a convexity with an air flow axis and increase an air flow speed in the upper fore surface of the blended wing body aircraft. This may be implemented, without limitation, as described above in reference to FIGS. 1-3. In some embodiments, upper aft surface may include an upper aft surface shaping configured to create a concavity with airflow axis and decrease airflow speed in upper aft surface of blended wing body aircraft. This may be implemented, without limitation, as described above in reference to FIGS. 1-3. In some embodiments, favorable environment for the propulsion system may include a conditioned region close to an entry of the propulsion system of blended wing body aircraft. This may be implemented, without limitation, as described above in reference to FIGS. 1-3.

With continued reference to FIG. 4, at step 410, method 400 includes assembling a propulsion system. This may be implemented, without limitation, as described above in reference to FIGS. 1-3. In some embodiments, propulsion system may include a separation distance between a first prime mover and a second prime mover. This may be implemented, without limitation, as described above in reference to FIGS. 1-3. Step 410 of assembling a propulsion system may further include covering one or more prime movers using a nacelle. This may be implemented, without limitation, as described above in reference to FIGS. 1-3. In some embodiments, prime mover may include a turbofan engine. In some embodiments, nacelle may include one or more pylons configured to connect nacelle with main body of blended wing body aircraft. In some embodiments, nacelle may further include a nacelle shaping configured to direct airflow towards one or more prime movers within nacelle. This may be implemented, without limitation, as described above in reference to FIGS. 1-3.

With continued reference to FIG. 4, at step 415, method 400 includes mounting propulsion system to upper aft surface of main body. This may be implemented, without limitation, as described above in reference to FIGS. 1-3. In some embodiments, mounting propulsion system may include mechanically fasten bottom of propulsion system to upper aft surface of main body using fasteners, such as bolts, rivets, and the like. In some embodiments, propulsion system may include an angle of attack. This may be implemented, without limitation, as described above in reference to FIGS. 1-3.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
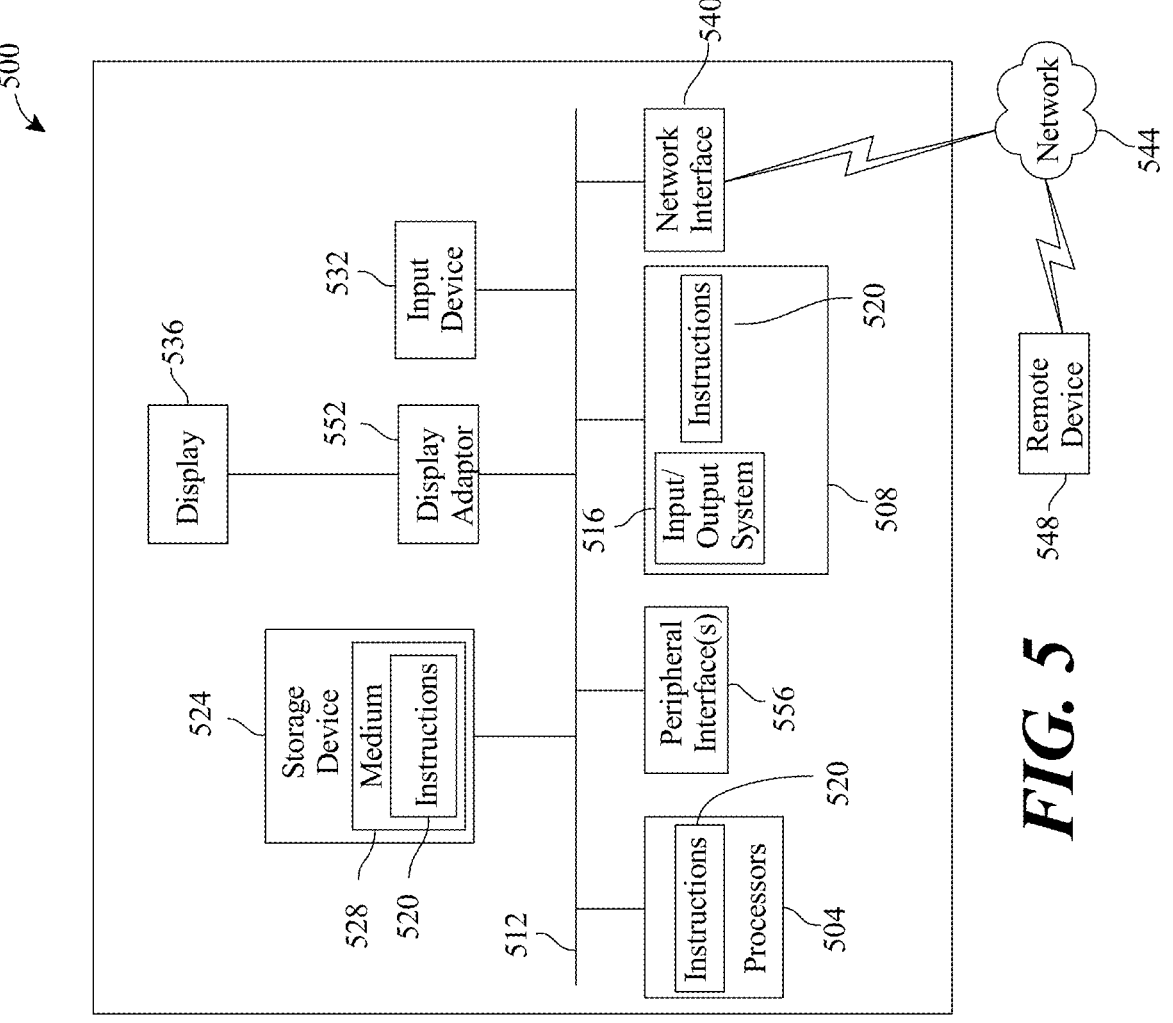
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Processor 504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 504 may be organized according to Von Neumann and/or Harvard architecture as a non-limiting example. Processor 504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for providing a favorable environment for a propulsion system of a blended wing body aircraft, wherein the system comprising:
   a blended wing body, wherein the blended wing body comprises:
      a main body, wherein the main body comprises:
         a main body shaping comprising an upper aft surface configured to provide the favorable environment for the propulsion system of the blended wing body aircraft, wherein the upper aft surface comprises an upper aft surface shaping configured to create a concavity with an airflow axis; and
      the propulsion system mounted to the upper aft surface of the main body at an orientation to create a predetermined angle of attack between a center line of the propulsion system and a vector representing relative motion between the propulsion system and surrounding atmosphere, wherein an inlet of the propulsion system is further mounted behind a vertex of an arc within the concavity of the upper aft surface shaping, wherein the propulsion system comprises:
         one or more prime movers; and
         a nacelle covering the one or more prime movers, wherein the nacelle comprises:
            a thrust reverser;
            a nacelle shaping, wherein the nacelle shaping is configured to direct airflow towards the one or more prime movers; and
            the inlet configured to receive the airflow and located at a forward end of the nacelle shaping, wherein the inlet and the angle of attack are configured such that during flight of the blended wing body aircraft at least a portion of the inlet is above a boundary layer formed over the upper aft surface of the main body shaping to enhance uniformity of the airflow at the inlet.

2. The system of claim 1, wherein the favorable environment for the propulsion system comprises a conditioned region close to an entry of the propulsion system of the blended wing body aircraft.

3. The system of claim 1, wherein the main body shaping further comprises:
   an upper fore surface, wherein the upper fore surface comprises an upper fore surface shaping.

4. The system of claim 3, wherein the upper fore surface shaping is configured to:
   create a convexity with an air flow axis; and
   increase an air flow speed in the upper fore surface of the blended wing body aircraft.

5. The system of claim 1, wherein the upper aft surface comprises the upper aft surface shaping configured to:
   decrease an airflow speed in the upper aft surface of the blended wing body aircraft.

6. The system of claim 1, wherein the one or more prime movers comprises a turbofan engine.

7. The system of claim 1, wherein the propulsion system comprises a separation distance between a first prime mover and a second prime mover.

8. The system of claim 1, wherein the inlet is configured to avoid ingestion of a boundary layer.

9. The system of claim 1, wherein the nacelle comprises one or more pylons, wherein the one or more pylons connect the nacelle with the main body of the blended wing body aircraft.

10. A method of manufacture of a system for providing favorable environment for a propulsion system of a blended wing body aircraft, wherein the method comprises:
   receiving a main body shaping for a main body of the blended wing body aircraft, wherein the main body shaping comprises an upper aft surface configured to provide the favorable environment for the propulsion system of the blended wing body aircraft wherein the upper aft surface comprises an upper aft surface shaping configured to create a concavity with an airflow axis;
   assembling the propulsion system at an orientation to create a predetermined angle of attack between a center line of the propulsion system and a vector representing relative motion between the propulsion system and surrounding atmosphere, wherein an inlet of the propulsion system is further mounted behind a vertex of an arc within the concavity of the upper aft surface shaping, wherein assembling the propulsion system comprises:
      covering one or more prime movers using a nacelle, wherein the nacelle comprises:
         a thrust reverser;
         a nacelle shaping, wherein the nacelle shaping is configured to direct airflow towards the one or more prime movers; and
         the inlet configured to receive the airflow and located at a forward end of the nacelle shaping,
         wherein the inlet and the angle of attack are configured such that during flight of the blended wing body aircraft at least a portion of the inlet is above a boundary layer formed over the upper aft surface of the main body shaping to enhance uniformity of the airflow at the inlet; and
   mounting the propulsion system to the upper aft surface of the main body.

11. The method of claim 10, wherein the favorable environment for the propulsion system comprises a conditioned region close to an entry of the propulsion system of the blended wing body aircraft.

12. The method of claim 10, wherein the main body further comprises:

an upper fore surface, wherein the upper fore surface comprises an upper fore surface shaping.

13. The method of claim 12, wherein the upper fore surface shaping is configured to:

create a convexity with an air flow axis; and increase an air flow speed in the upper fore surface of the blended wing body aircraft.

14. The method of claim 10, wherein the upper aft surface shaping is configured to;

decrease an airflow speed in the upper aft surface of the blended wing body aircraft.

15. The method of claim 10, wherein the one or more prime movers comprises a turbofan engine.

16. The method of claim 10, wherein the propulsion system comprises a separation distance between a first prime mover and a second prime mover.

17. The system of claim 1, wherein the inlet is configured to avoid ingestion of the boundary layer.

18. The method of claim 10, wherein the nacelle comprises one or more pylons, wherein the one or more pylons connect the nacelle with the main body of the blended wing body aircraft.

* * * * *